United States Patent [19]

Cumberledge et al.

[11] Patent Number: 5,373,153
[45] Date of Patent: Dec. 13, 1994

[54] OPTOELECTRONIC TILT DETECTOR HAVING TAPERED FLOORS EXTENDING IN SAME DIRECTION

[75] Inventors: William S. Cumberledge, Scottsdale; David L. Vowles, Phoenix, both of Ariz.

[73] Assignee: Motorola, Inc., Schaumburg, Ill.

[21] Appl. No.: 334

[22] Filed: Jan. 4, 1993

[51] Int. Cl.$^5$ ............................................. G01D 5/34
[52] U.S. Cl. ................................ 250/231.1; 33/366; 73/517 R
[58] Field of Search ................ 250/231.1, 221, 229; 33/365, 366; 340/689; 73/517 R, 517 B, 518

[56] References Cited

U.S. PATENT DOCUMENTS

| | | | |
|---|---|---|---|
| 4,450,353 | 5/1984 | Sjolund | 250/231.1 |
| 4,556,799 | 12/1985 | Rolando | 250/231.1 |
| 4,972,595 | 11/1990 | Shimamura et al. | 33/366 |
| 5,042,158 | 8/1991 | Schmelzer | 33/366 |
| 5,202,559 | 4/1993 | Durst | 250/231.1 |

OTHER PUBLICATIONS

Howard Anton, "Calculus with Analytic Geometry", 1980, pp. 875-878.

*Primary Examiner*—Edward P. Westin
*Assistant Examiner*—Stephone B. Allen
*Attorney, Agent, or Firm*—Rennie William Dover

[57] ABSTRACT

An optoelectronic tilt detector (10 and 35) having a cavity (17) is provided. The cavity (17) has a sidewall (18), a tapered floor (19), and a tapered ceiling (20). The tapered floor (19) and the tapered ceiling (20) have a first passage (23) and a second passage (24) through which radiation such as light may pass. Housed within the cavity (17) is an opaque sphere (14). The opaque sphere (14) moves within the container (17) in accordance with the tilt of the cavity (17) to uncover either the first passage (23) or the second passage (24). The opaque sphere (14) may operate in conjunction with a light emitting device (12) and a light detector (13) to allow radiation to travel from the light emitting device (12) to the light detector (13) when the cavity (17) is tilted, thereby providing a measure of tilt.

8 Claims, 3 Drawing Sheets

OPTOELECTRONIC TILT DETECTOR HAVING TAPERED FLOORS EXTENDING IN SAME DIRECTION

BACKGROUND OF THE INVENTION

This invention relates, in general, to tilt detectors, and more particularly to optoelectronic tilt detectors.

Tilt detectors are used in a variety of applications including medical, automotive, and industrial controls. In the medical field, for example, a tilt detector may be used in electronically controlled vaporizing systems which dispense precise quantities or dosages of drugs. These vaporizing systems must be in a spatial orientation such that their angle of tilt is within a specified design limit. The tilt detector monitors the vaporizing system's angle of tilt and indicates when the angle of tilt is within or exceeds the design limit. In the event the angle of tilt exceeds the specified design limit, the vaporizing system is disabled to prevent dispensation of incorrect drug dosages.

Typically, the tilt detector includes tilt detector circuitry comprising a heavy metal such as, for example, mercury. However, heavy metals are expensive and pose an environmental hazard. More particularly, the use of mercury must be eliminated to adhere to future environmental laws. Accordingly, it would be advantageous to have a tilt detector capable of accurately and economically indicating tilt or offset without the use of heavy metals such as mercury.

SUMMARY OF THE INVENTION

Briefly stated, the present invention is an optoelectronic tilt detector comprising a container having sidewalls and at least a tapered floor. A passage through the tapered floor provides access to an interior portion of the container. An opaque sphere rests on the tapered floor. When the container is in a nontilted orientation, the opaque sphere covers the passage. When the container is tilted such that the angle of tilt is greater than the angle of the tapered floor, also referred to as an incline angle, the opaque sphere moves thereby uncovering the passage. The presence of the opaque sphere over the passage is a function of the tilt of the container.

DETAILED DESCRIPTION OF THE DRAWINGS

Figure 1:
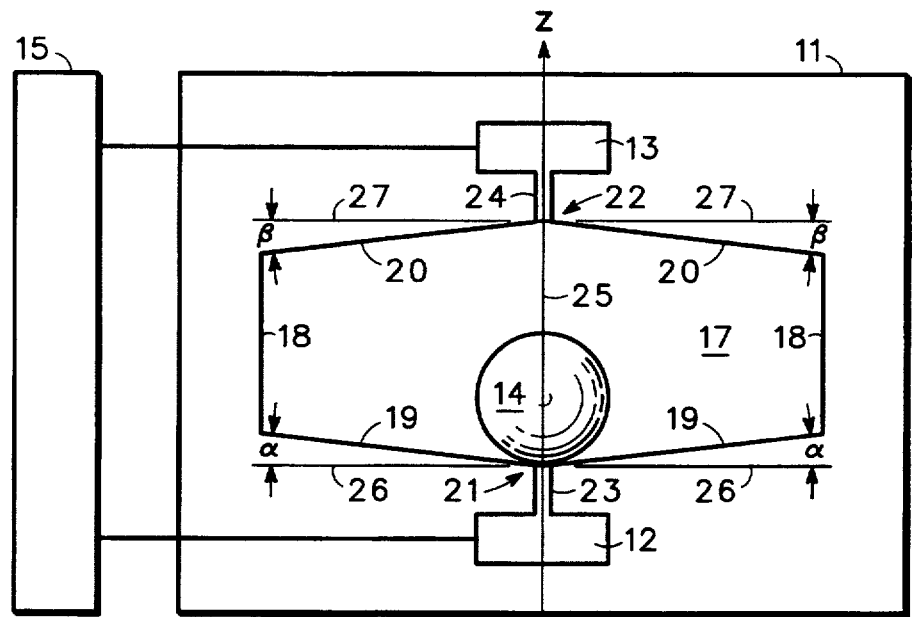
FIG. 1 illustrates a highly enlarged cross-sectional view of a bi-directional embodiment of an optoelectronic tilt detector having two optoelectronic devices in accordance with the present invention.

A tilt detector may be used as a clinometer or as a component in a switch wherein the switch changes state in accordance with a spatial orientation of the tilt detector. FIG. 1 illustrates a highly enlarged cross-sectional view of a tilt detector 10 having two optoelectronic devices in accordance with the present invention. Tilt detector 10 includes a case 11 in which a cavity 17 is enclosed by a lateral sidewall 18, a floor 19, and a ceiling 20. Case 11 is also referred to as a container and cavity 17 is also referred to as a tilt transducing cavity. Housed within cavity 17 is an opaque sphere 14 which can move freely inside cavity 17. Opaque sphere 14 is also referred to as an opaque orb. The material for opaque sphere 14 is capable of blocking light or other radiation and may be plastic, hard rubber, opaque glass, stainless steel, or the like. Further, opaque sphere 14 may be a ball bearing. It is desirable that opaque sphere 14 not be influenced by static electricity or the surface tension of moisture that might be present within case 11.

A first passage 23 is connected to floor 19 and serves to couple the radiation emitted by a light emitting device 12 with cavity 17. Light emitting device 12 serves as a light emission source. A second passage 24 is connected to ceiling 20 and serves to couple the radiation in cavity 17 with a light detector 13, wherein the radiation was generated by light emitting device 12. Light detector 13 is also referred to as a light detecting device. First and second passages 23 and 24, respectively, are also referred to as first and second channels or first and second apertures 23 and 24, respectively. In one embodiment, light emission device 12 is an MLED71 and light detector 13 is an MRD750. The MLED71 and the MRD750 are manufactured by Motorola Inc. First passage 23 is aligned with second passage 24 so that radiation such as, for example, light or a light signal emitted from light emitting device 12 travels along signal path 25 towards light detector 13 when first passage 23 is uncovered by opaque sphere 14. In other words, first and second passages 23 and 24 are aligned so that radiation emitted from light emission device 12 arrives at light detector 13 when opaque sphere 14 does not block signal path 25. Signal path 25 is also referred to as a light signal path or a radiation signal path.

Light emitting device 12 and light detector 13 may be incorporated with switching circuitry 15 to form a switch (not shown). Switches generally operate in either an "on" state or an "off" state. In the present invention, the switch formed from tilt detector 10 and switching circuitry 15 is hereby defined herein as "on" or being in an "on" state when radiation from light emitting device 12 is detected by light detector 13, and "off" or being in an "off" state when light detector 13 does not detect or respond to radiation from light emitting device 12. It shall be understood that the definition of "on" or "off" is arbitrary and provided to aid in understanding the present invention, and thus are not limitations of the present invention.

Case 11 may be formed from a molded structure having a first piece and a second piece. The first piece and the second piece each include a portion of a first receptacle for accepting light emitting device 12 and a portion of a second receptacle for accepting light detector 13 as well as a portion of cavity 17. Cavity 17 is between the first and the second receptacles. Light emitting device 12 and light detector 13 are placed in the portions of their respective receptacles in the first piece and sphere 14 is placed in the portion of cavity 17 in the first piece. The first and second pieces are joined together thereby forming case 11 having a single cavity 17 and single first and second receptacles. The pieces may be snapped or snap-welded together. Case 11 is sealed along the seam between the first and second portions.

Tilt detector 10 of FIG. 1 is an example of an embodiment hereby defined herein as a bi-directional embodiment. In this embodiment, an angle of tilt, $\Phi$, (shown in FIG. 2) of case 11 with respect to a reference such as the z-axis of the Spherical coordinate system may be determined for case 11 in either an upright or an inverted configuration. FIGS. 1, 3, 4, and 5 include reference coordinates of a Spherical coordinate system wherein the z-axis is aligned with signal path 25 when path 25 is blocked by sphere 14 or sphere 33. A review of the Spherical coordinate system is presented on pages 875–878 in Howard Anton's "Calculus with Analytic Geometry," copyrighted by John Wiley and Sons, Inc. in 1980, which is hereby incorporated herein by reference.

It shall be understood that the terms "upright" and "inverted" merely serve to facilitate an understanding of the present invention by defining two structural orientations of case 11. In a first orientation wherein opaque sphere 14 rests on floor 19, case 11 is defined to be in an upright position. In a second orientation wherein opaque sphere 14 rests on ceiling 20, case 11 is defined to be in an inverted position. Preferably incline angles $\alpha$ and $\beta$ are substantially equal in embodiments wherein tilt detector 10 is to perform the same function in either the upright or the inverted configuration.

In the bi-directional embodiment, floor 19 has an apex 21 and ceiling 20 has an apex 22, wherein apices 21 and 22 point in opposite directions. Apices 21 and 22 are also referred to as first and second cavity vertices or top and bottom vertices, respectively. In addition, apices 21 and 22 include passages 23 and 24, respectively, which allow transmission of radiation or light from light emitting device 12 to light detector 13.

Floor 19 and ceiling 20 form characteristic incline angles denoted $\alpha$ and $\beta$ in FIGS. 1–5. Incline angle $\alpha$ is the angle between an imaginary reference line 26 and floor 19 wherein imaginary reference line 26 is perpendicular to the z-axis and extends laterally from an apex of floor 19 towards a side of the case. Incline angle $\beta$ is the angle between an imaginary reference line 27 and ceiling 20 wherein imaginary reference line 27 is perpendicular to the z-axis and extends laterally from an apex of ceiling 20 in FIGS. 1–3, or from an apex of ceiling 36 of FIGS. 4–5, towards a side of the case. Floor 19 and ceiling 20 are constructed having incline angles $\alpha$ and $\beta$, respectively, such that opaque sphere 14 remains over either passage 23 or passage 24 until the case achieves a desired tilt. Incline angles $\alpha$ and $\beta$ may range from approximately near 0 degrees to approximately 90 degrees.

Figure 2:
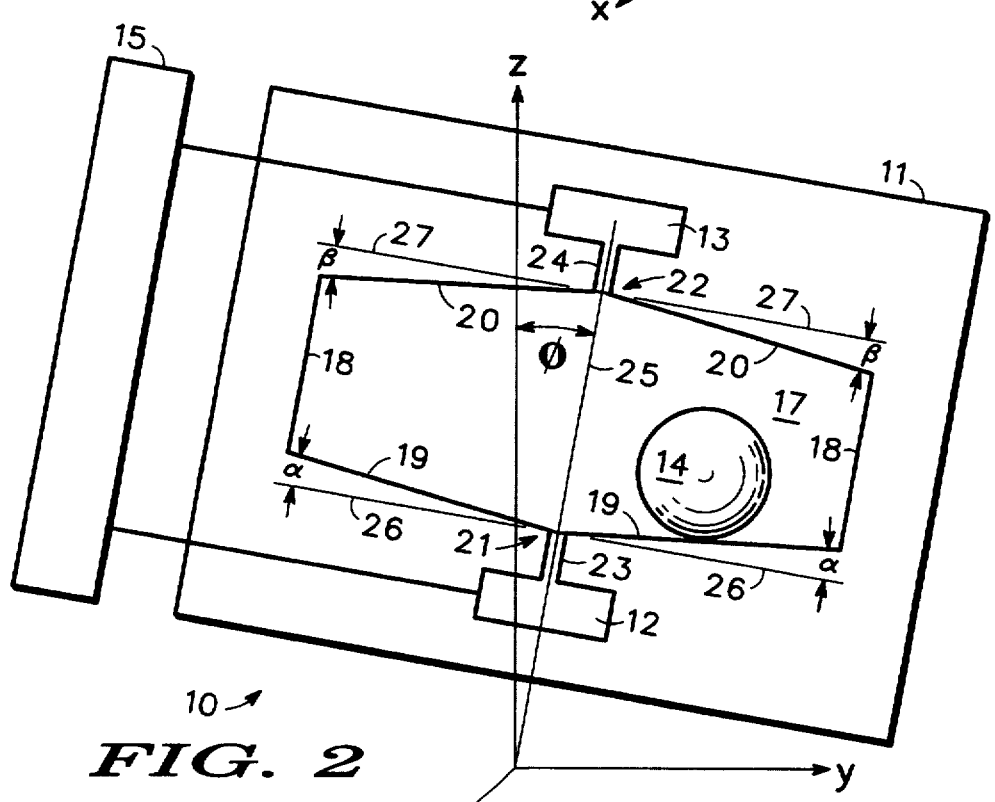
FIG. 2 illustrates the embodiment of FIG. 1 in a tilted spatial orientation.

Tilt detector 10 of FIG. 1 is shown in a nontilted spatial orientation. In the nontilted spatial orientation, signal path 25 is aligned with the z-axis, and substantially perpendicular to the x-y plane of the Spherical coordinate system, and angle of tilt $\Phi$ is substantially zero degrees. Angle of tilt $\Phi$ is the angle between the z-axis and the signal path 25. Thus, angle of tilt $\Phi$ between signal path 25 and the z-axis in FIG. 1 is approximately zero degrees. FIG. 2, on the other hand, illustrates tilt detector 10 in a tilted spatial orientation. In the tilted spatial orientation, tilt angle $\Phi$ is an angle other than zero degrees.

Referring again to FIG. 1, an example of the bi-directional embodiment is illustrated wherein lateral sidewall 18 may be cylindrical, circular, or annular in shape, and floor 19 and ceiling 20 are conically shaped. Conically shaped floor 19 has an apex 21 and conically shaped ceiling 20 has an apex 22. Thus, floor 19 and ceiling 20 are tapered. Apices 21 and 22 have passages 23 and 24, respectively, which are aligned so that radiation travels through both passages and along signal path 25. In an "upright" nontilted spatial orientation, opaque sphere 14 covers passage 23.

Referring now to FIG. 2, opaque sphere 14 continues to cover passage 23 as case 11 is tilted until case 11 is tilted such that tilt angle $\Phi$ is greater than incline angle $\alpha$. When tilt angle $\Phi$ is greater than incline angle $\alpha$, opaque sphere 14 moves and uncovers passage 23. Radiation emitted from light emitting device 12 travels through passage 23, along signal path 25, through passage 24 and impinges on light detector 13. The radiation stimulates light detector 13 which sends a signal to circuitry 15 indicating that tilt angle $\Phi$ is greater than incline angle $\alpha$. For a tilt detector 10 that is part of a switch, the signal from light detector 13 causes the switch (not shown) to change from an "off" state to an "on" state.

Tilting tilt detector 10 such that tilt angle $\Phi$ is less than incline angle $\alpha$ positions opaque sphere 14 over passage 23 and prevents radiation from travelling along signal path 25 and, thereby, from impinging on light detector 13. Thus, a tilt angle $\Phi$ having a value less than that of incline angle $\alpha$ is detected by the absence of radiation or a light signal impinging on light detector 13. In the example wherein tilt detector 10 forms part of a switch (not shown), the absence of a light signal at light detector 13 changes an electrical output signal of light detector 13 thereby causing the switch to change back to the "off" state.

It shall be understood that the structure for forming cavity 17 is not a limitation of the present invention. In other words, other cavity structures having a lateral sidewall 18 and floor 19 with an apex 21 and a passage 23, and ceiling 20 having an apex 22 and a passage 24 are encompassed within the scope of the present invention. For example, sidewalls 18 may be rectangular, and floor and ceiling 19 and 20, respectively, may be pyramidal or triangular shaped. Further, sidewalls 18 may be circular or rectangular, and floor and ceiling 19 and 20, respectively, may be bevelled.

It shall be further understood that owing to the symmetry of case 11, operation of case 11 in the inverted configuration is the same as operation in the upright configuration. However, the description of the incline angles should be changed such that incline angle $\beta$ replaces incline angle $\alpha$.

Figure 3:
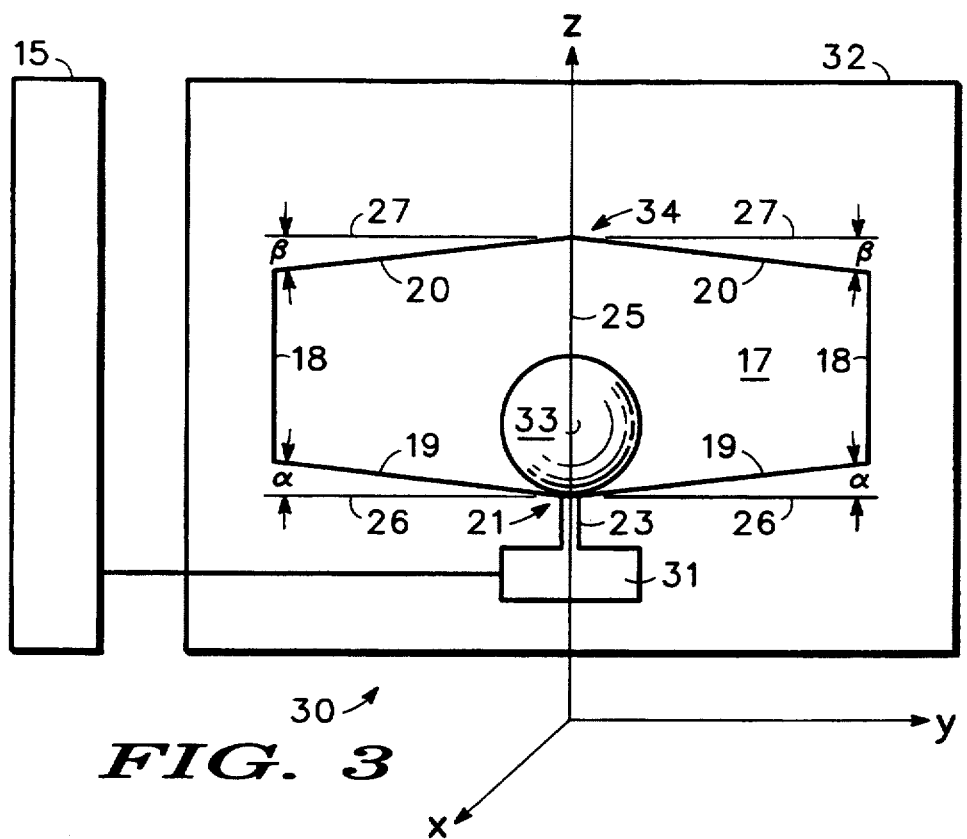
FIG. 3 illustrates an embodiment of an optoelectronic tilt detector having a single optoelectronic device in accordance with the present invention.

FIG. 3 illustrates an example of the bi-directional embodiment of tilt detector 30 having a case 32 with a cavity 17 and a single light emitter-detector 31. Light emitter-detector 31 may be, for example, a light emitter-detector sold by Motorola, Inc. as part number SOC943. As in FIG. 1, lateral sidewall 18 is circular, and floor 19 and ceiling 20 are conically shaped having apices 21 and 34, respectively, wherein apices 21 and 34 point in opposite directions. Further, light emitting device 12 and light detector 13 may be incorporated with switching circuitry 15 to form a switch (not shown). However, only apex 21 includes a passage 23 through which light travels. In the single light emitter-detector example, ceiling 20 is non-reflective to radiation and sphere 33 is capable of reflecting radiation back through passage 23.

In a nontilted upright position, reflective sphere 33 covers passage 23 thereby reflecting radiation back to light emitter-detector 31. The reflected radiation generates an electrical output response from light emitter-detector 31.

Similar to the embodiment shown in FIG. 1, reflective sphere 33 continues to cover passage 23 as case 32 is tilted, until case 32 reaches tilt angle Φ which is greater than incline angle α. When tilt angle Φ is greater than incline angle α, sphere 33 moves and uncovers passage 23. Radiation emitted from light emitter-detector 31 travels through passage 23, along signal path 25, and impinges on ceiling 20. Ceiling 20 absorbs substantially all the radiation emitted from light emitter-detector 31. Thus, the intensity of the radiation or light signal that is reflected back to light emitter-detector 31 is too low for the detector portion to detect. The absence of reflected radiation impinging on light emitter-detector 31 indicates that tilt angle Φ is greater than incline angle α. For a tilt detector 30 that is part of a switch (not shown), the electrical output signal from the light detecting portion of light emitter-detector 31 causes the switch to be in an "off" state.

Tilting case 32 such that tilt angle Φ is less than incline angle α moves reflective sphere 33 over passage 23 such that radiation is reflected back towards light emitter-detector 31. The reflected radiation generates an electrical output response from light emitter-detector 31. In the example of tilt detector 30 forming part of a switch, the electrical output response from light emitter-detector 31 places the switch in an "on" state.

Figure 4:
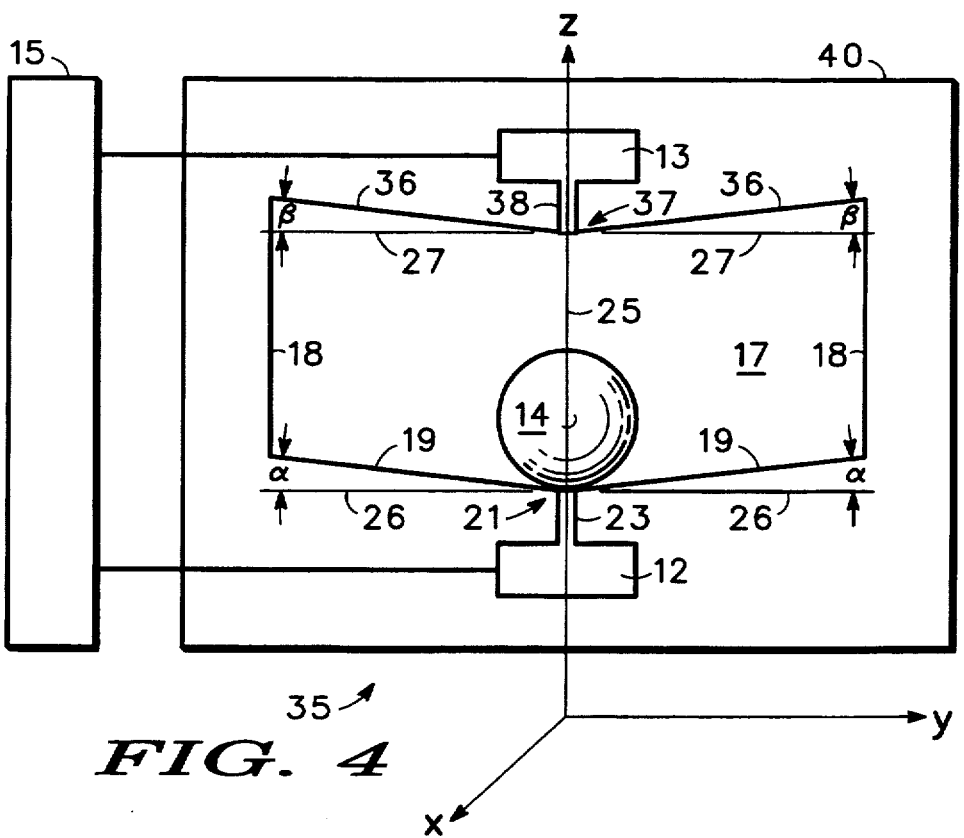
FIG. 4 illustrates a unidirectional embodiment an optoelectronic tilt detector having two optoelectronic devices in accordance with the present invention.

FIG. 4 illustrates an example of a unidirectional embodiment of a tilt detector 35 having a case 40 with a cavity 17 and two optoelectronic devices. Cavity 17 has a lateral sidewall 18 wherein lateral sidewall 18 may be cylindrical, circular, or annular in shape, and floor 19 and ceiling 36 are conically shaped. In the unidirectional embodiment, a ceiling 36 has an apex 37 that points in the same direction as apex 21 of floor 19. Like the example of FIG. 1, apices 21 and 37 have passages 23 and 38, respectively. Further, the unidirectional embodiment shown in FIG. 4 operates in the same fashion as the upright bi-directional embodiment as described in FIG. 1. Since apices 21 and 37 both point in the same direction when tilt detector 35 is inverted, opaque sphere 14 can not block passages 23 and 38. Thus, tilt detector 35 is capable of sensing an inverted configuration as well as a tilted orientation. Light emitting device 12 and light detector 13 may be incorporated with switching circuitry 15 to form a switch (not shown).

Figure 5:
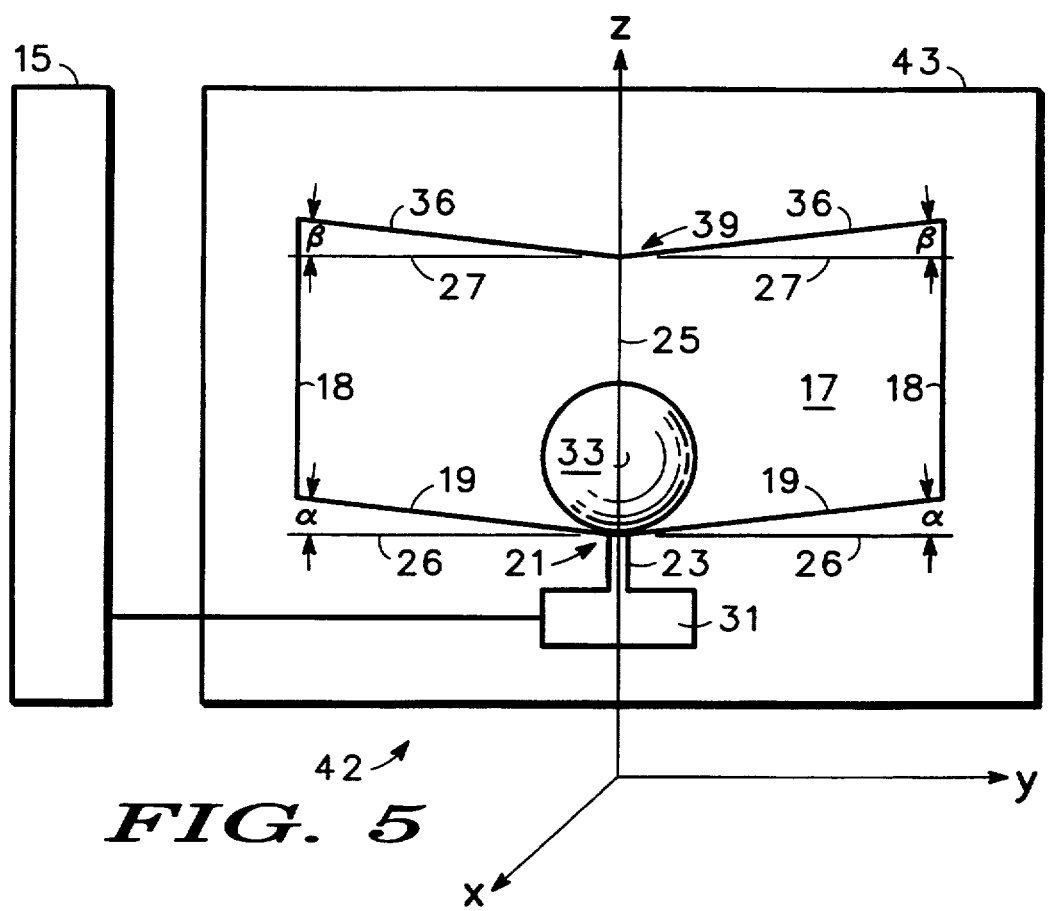
FIG. 5 illustrates a unidirectional embodiment of an optoelectronic tilt detector having a single optoelectronic device in accordance with the present invention.

FIG. 5 illustrates an example of a unidirectional embodiment of a tilt detector 42 having a case 43 with a single optoelectronic device. Cavity 17 has a lateral sidewall 18 wherein lateral sidewall 18 may be cylindrical, circular, or annular in shape, and floor 19 and ceiling 36 are conically shaped. In the unidirectional embodiment, a ceiling 36 has an apex that points in the same direction as apex 21 of floor 19. Like the example of FIG. 3 only apex 21 has a passage 23. Further, the unidirectional embodiment shown in FIG. 5 operates in the same fashion as the upright bi-directional embodiment as described in FIG. 3. Since apices 21 and 39 both point in the same direction, sphere 33 can not block passage 23 when tilt detector 35 is in an inverted configuration. As in the unidirectional embodiment described in FIG. 4, tilt detector 42 is capable of sensing an inverted configuration as well as a tilted orientation.

Light emitter-detector 31 may be incorporated with switching circuitry 15 to form a switch (not shown).

By now it should be appreciated that the present invention provides a tilt detector which may be used as a component of a switch. The tilt detector uses a sphere in conjunction with a container having a tapered floor to indicate an angle of tilt. The sphere may be opaque or reflective. The sphere uncovers a passage or channel in either the tapered ceiling or the tapered floor in accordance with the amount or degree of tilt of the case. In an upright orientation, an angle of tilt Φ greater than an incline angle α is sufficient for the sphere to move thereby uncovering the passage. The sphere remains over the passage when the angle of tilt Φ is less than the incline angle α. In a bi-directional embodiment operating in an inverted orientation, an angle of tilt, Φ, greater than an incline angle β is sufficient for the sphere to move thereby uncovering the passage. Thus, the tilt detector of the present invention provides a means for determining tilt without using a heavy metal such as mercury.

Other advantages include use in either an upright or inverted configuration and the ability to measure tilt for an angle Φ about the z-axis.

We claim:

1. An optoelectronic tilt detector, comprising:
   an opaque sphere;
   a cavity for housing the opaque sphere wherein the cavity comprises:
   a lateral sidewall;
   a tapered floor having a first cavity vertex and a first passage extending therethrough, wherein the tapered floor extends from a first portion of the lateral sidewall; and
   a tapered ceiling having a second cavity vertex, the tapered ceiling extending from a second portion of the lateral sidewall, wherein the tapered floor and tapered ceiling are tapered in the same direction;
   a light emission source for transmitting light through the first passage, the second passage, and the cavity; and
   a light detector for detecting light emitted by the light emission source.

2. An optoelectronic tilt detector as claimed in claim 1, wherein the lateral sidewall forms an annular wall and the floor and the ceiling are conically shaped, and wherein the ceiling has a second passage extending therethrough.

3. A clinometer, comprising:
   a tilt transducing cavity having a sidewall, a tapered ceiling, and a tapered floor, wherein the tapered ceiling has a top vertex, the tapered floor has a bottom vertex and a first passage, and the tapered floor and tapered ceiling are tapered in the same direction;
   an opaque orb, the opaque orb housed within the tilt transducing cavity;
   a light emission source for transmitting light through the first passage into the tilt transducing cavity; and
   a light detector for detecting light transmitted from the light emission source into the tilt transducing cavity.

4. A clinometer as claimed in claim 3, wherein the tilt transducing cavity is cylindrically shaped, and the floor and the ceiling are conically shaped.

5. A tilt detector, comprising:

a container having sidewalls, a tapered floor, and a tapered ceiling, wherein the tapered ceiling and the tapered floor are tapered in the same direction;

a first passage into the container through the tapered floor; and a sphere housed within the container.

6. A tilt detector as claimed in claim 5 wherein the sphere is stainless steel.

7. A tilt detector as claimed in claim 5 wherein the sphere is a ball bearing.

8. A tilt detector as claimed in claim 5, wherein the tapered ceiling comprises a second passage through the tapered ceiling into the container.

* * * * *